(12) United States Patent
Simmons

(10) Patent No.: US 6,496,388 B2
(45) Date of Patent: Dec. 17, 2002

(54) QUASI-RESONANT CONVERTER

(75) Inventor: Michael C. Simmons, Mountaintop, PA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 09/839,374

(22) Filed: Apr. 20, 2001

(65) Prior Publication Data

US 2001/0033499 A1 Oct. 25, 2001

Related U.S. Application Data

(60) Provisional application No. 60/198,692, filed on Apr. 20, 2000.

(51) Int. Cl.[7] .............................................. H02M 3/335
(52) U.S. Cl. ..................................... 363/21.03; 323/222
(58) Field of Search ......................... 363/16, 20, 21.01, 363/21.02, 21.03, 97, 131; 323/222, 229, 232

(56) References Cited

U.S. PATENT DOCUMENTS

| | | | |
|---|---|---|---|
| 4,138,715 A | | 2/1979 | Miller |
| 4,720,667 A | | 1/1988 | Lee et al. |
| 4,720,668 A | * | 1/1988 | Lee et al. ..................... 323/235 |
| 5,047,913 A | | 9/1991 | Doncker et al. |
| 5,486,752 A | | 1/1996 | Hua et al. |
| 5,594,635 A | | 1/1997 | Gegner |
| 5,633,579 A | * | 5/1997 | Kim ............................. 323/222 |
| 5,781,418 A | * | 7/1998 | Chang et al. ................ 315/307 |
| 5,786,992 A | | 7/1998 | Vinciarelli et al. |
| 5,815,386 A | * | 9/1998 | Gordon ....................... 323/222 |
| 5,880,940 A | | 3/1999 | Poon |
| 5,889,667 A | | 3/1999 | Bernet |
| 5,914,587 A | * | 6/1999 | Liu ............................... 323/222 |
| 6,018,469 A | | 1/2000 | Poon |
| 6,051,961 A | | 4/2000 | Jang et al. |
| 6,069,801 A | | 5/2000 | Hodge, Jr. et al. |

* cited by examiner

Primary Examiner—Jeffrey Sterrett
Assistant Examiner—Gary L. Laxton
(74) Attorney, Agent, or Firm—Thomas R. FitzGerald, Esq.

(57) ABSTRACT

A converter 10 has an IGBT power switch 34. A resonant tank circuit 30 couples the IGBT to a voltage source. A gate controller turns the IGBT on and off by applying a suitable gate control voltage to the gate. The resonant tank circuit imposes a sinusoidal waveform on the emitter current. After the emitter current reverses direction, the gate signal is terminated and the IGBT is shut off. Minority carriers in the emitter are swept away by the tank circuit and are further deposited in a transformer that is coupled to the tank circuit.

9 Claims, 2 Drawing Sheets

QUASI-RESONANT CONVERTER

CROSS-REFERENCE TO RELATED APPLICATIONS

This application claims the benefit of U.S. Provisional Patent Application Ser. No. 60/198,692, filed Apr. 20, 2000.

BACKGROUND

This invention relates to DC-to-DC converters and, in particular, to quasi-resonant converters using Insulated Gate Bipolar Transistors (IGBT).

Quasi-resonant switching converters are used to convert one level of DC voltage and current to another level of DC level and current. They provide a similar function for direct current conversion that transformers provide for AC current and voltage converters use power semiconductor devices that turn off and on at relatively high rates. DC output is modulated by the time that the power devices are either on or off. This time is typically referred to as the "duty cycle". The devices can be rapidly switched on or off and the resulting output is applied to an output filter for smoothing out the variations and switching waveforms.

Modern switching converters frequently use techniques that were pioneered by Edward J. Miller in his U.S. Pat. No. 4,138,715 issued Feb. 6, 1979. In that patent the basic problem of switching losses in DC converters is solved by applying a tank circuit to the switch. When power semiconductor devices are switched at full current or full voltage, it takes a significant amount of time for the device to return to zero current or zero volts. In that time, the device and the circuit can experience short transients with relatively high peaks. These transients represent a waste of power and also a source of unwanted electromagnetic interference. In addition, rapid switching at high currents and high voltages creates thermal stresses on the power semi-conductors and thereby limits their useful life.

IGBTs are popular switching devices. One of their benefits is that they provide very low resistance in their on state. In addition, they can be rapidly switched on and off using their MOS controlled gate. In general, their on resistance is substantially less than power MOSFETs and they can handle higher currents for similar size devices. However, one drawback of the IGBT is that it includes minority carriers. If there is a high voltage or a high current in the collector when the IGBT is switched off, those carriers must be removed. Unfortunately, the minority carriers decay by recombination over a period of time. In effect, the presence of minority carriers in the collector resembles the discharge of a capacitor. When there are a large number of minority carriers, they can generate a substantial amount of heat until they are removed from the collector. This feature of IGBTs has limited their usefulness in DC-to-DC converters.

SUMMARY

The invention overcomes the defects of the prior art and solves the problem of the slow decay of minority carriers in IGBTs by providing a quasi-resonant circuit for an IGBT in a DC-to-DC converter. A resonant tank circuit is coupled to the collector of the IGBT. The resonant tank circuit generates a quasi-sinusoidal waveform for the collector voltage and for the emitter current. After the collector voltage falls below ground, the gate pulse is terminated and the IGBT turns off. Then, the minority carriers on the collector are swept away by the inductor of the tank circuit. Those minority carriers are stored in a capacitor that is coupled across the primary winding of the transformer. In this way, the minority carriers are rapidly removed from the collector thereby quickly discharging the IGBT and making it ready for its next cycle.

DRAWINGS

Figure 3:
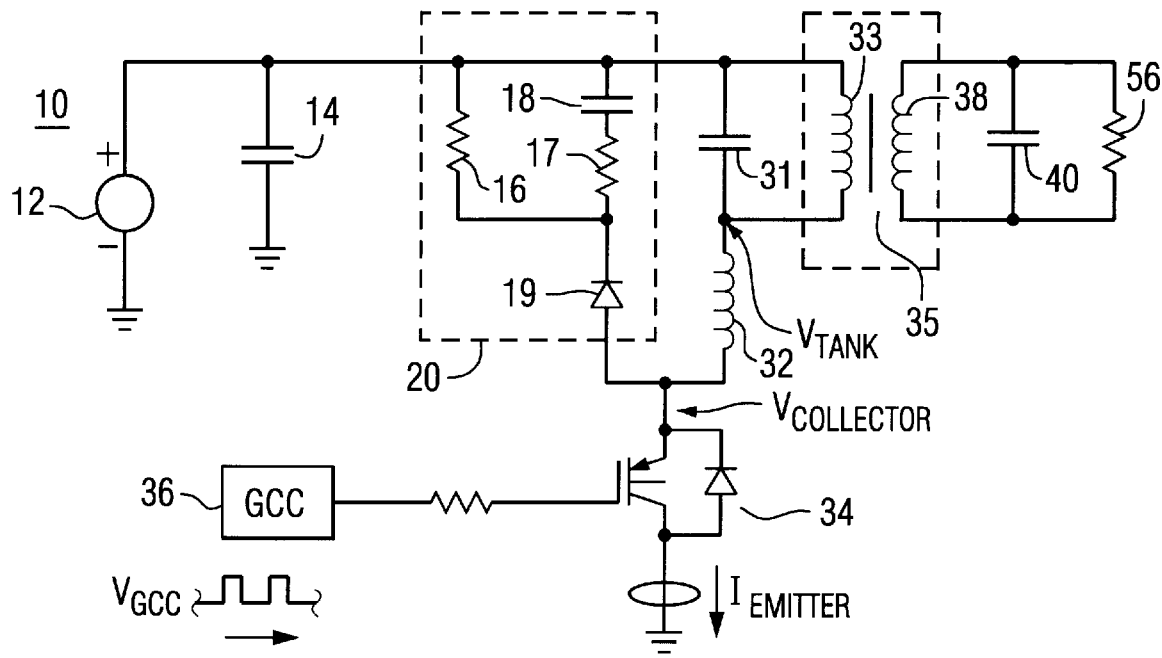
FIG. 3 is a schematic diagram of the inventive quasi-resonant converter with an IGBT converter.

FIGS. 4(a)–4(d) are timing diagrams showing operations of the circuit of FIG. 3.

DETAILED DESCRIPTION

Figure 1:
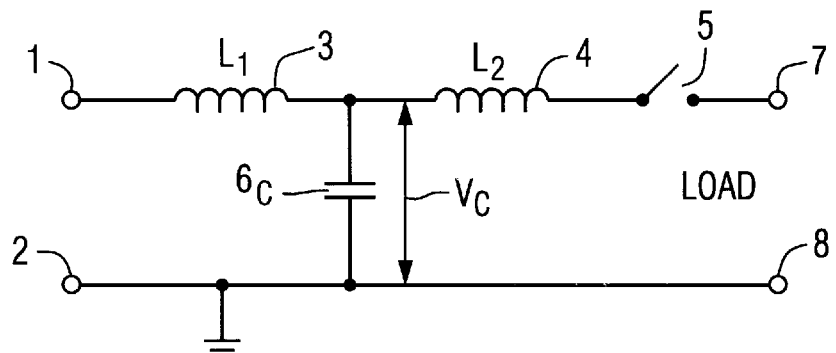
FIG. 1 is a schematic diagram of a basic prior art resonant converter.
Figure 2:
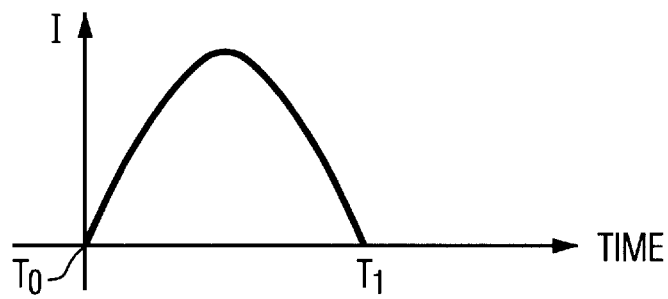
FIG. 2 is a timing diagram of the current output of the converter shown in FIG. 1.

FIGS. 1 and 2 are presented to show background information on the fundamental characteristics of resonant switching DC-to-DC converters. Turning to FIG. 1, a voltage source is connected across input terminals 1 and 2. Two inductors, 3 and 4, are connected in series between the input terminal 1 and a power switching device 5. Capacitor 6 is connected between the junction of the conductors 3 and 4 and a reference potential such as ground. Input terminal 2 is also a referenced ground. A load is connected to output terminal 7 and output terminal 8 is connected to ground. The capacitor 6 is charged through the inductor 3 and, when switch 5 is closed, the capacitor 6 discharges through inductor 4.

At a time T equal to zero, the voltage $V_c$ across the capacitor $6_c$ is positive relative to ground. Switch 5 is turned on at time $T_0$. The values of the inductances $L_1$ and $L_2$ of the inductors 3 and 4, respectively, are chosen t set the resonant frequency of $L_2C$ high as compared to the resonant frequency of $L_1C$. Because of this relationship, the current inductor 3 has only a minor effect on the resonant behavior of the current in inductor 4. So, beginning at time $T_0$, the current I rises and falls sinusoidally, reaching 0 at a time $T=T_1$. At that point the energy in the inductor 4 is zero. Control devices (not shown) sense the condition and turn switch 5 off at zero cross-over point of the current. Such control devices are well known in the art and are not illustrated herein. The switching losses at time T=0 and a time $T=T_1$ are zero. Following the time $T=T_1$, there is a recovery period for the capacitor 6 to recharge through the inductor 3 before the switch 5 can again be turned on.

Those skilled in the art will appreciate that the switch 5 may be substituted by any power semi-conductor device including power bi-polar transistors, power MOSFETs, and IGBTs. However, IGBTs present unique problems in DC-to-DC converters. IGBTs employ minority carriers and those minority carriers may collect in the collector while the IGBT is operating. The presence of minority carriers lengthens the time for the IGBT to shut off and imposes power losses on the converter. It is highly desirable to use IGBTs in DC-to-DC converters. This is especially true for DC-to-DC converters used in connection with personal computers. Given the low on resistance of IGBTs, they represent a significant potential power saving as well as improved performance for personal computers, and other portable electronic devices.

Turning to FIG. 3, there is shown a schematic diagram for a DC-to-DC converter 10 with an IGBT power switch. A conventional full wave bridge (not shown) or other suitable AC to DC converter converts at an alternating current into a DC voltage source 12. The DC voltage source 12 may vary between 127 to 374 volts. A capacitor 14 is connected in parallel with the voltage source 12. The capacitor 14 is typically rated as high as 400 volts and may be 150 micro farad capacitor. A clamp circuit 20 is connected between the capacitor 14 and IGBT 34. Clamp circuit 20 includes a diode 19 whose anode is connected to the collector of the IGBT 34. The cathode of diode 19 is connected to a parallel network that includes in one leg a resistor 16 of approximately 33k ohms and in its other legs a series connection of a 10 ohm resistor 17 and a 0.0022 micro farad capacitor 18. The clamp circuit operates to clamp the voltage to 600 volts or less. Also connected to the collector of IGBT 34 is tank circuit 30. That circuit includes tank capacitor 31 which is approximately 0.0022 micro farads in series with tank inductor 32, 70 micro henries. Tank capacitor 31 is also connected across the primary winding 33 of transformer 60. The secondary winding 38 of transformer 60 is coupled across output capacitor 40 and a load resistor 56. The output capacitor 40 is approximately 1800 micro farads and the output resistor 56 is approximately 5.43 ohms.

The IGBT 34 is driven by a conventional gate driver circuit 36. It provides a pulse-type output to the gate G of the IGBT 34. It is connected to the gate G by a 10 ohm resistor. The emitter of the IGBT is connected to ground. The IGBT is turned on by the gate pulse from gate control circuit 36. The output of the converter circuit 10 is switched off not when the collector of the IGBT is at zero volts, but only after the collected has been driven slightly negative. This feature is contrary to the accepted teachings of the prior art that shut the power switch off at either zero current or zero voltage. As will become apparent by the following description, the IGBT is not turned off until its collector voltage has gone slightly negative.

Figures 4A, 4B, 4C, 4D:
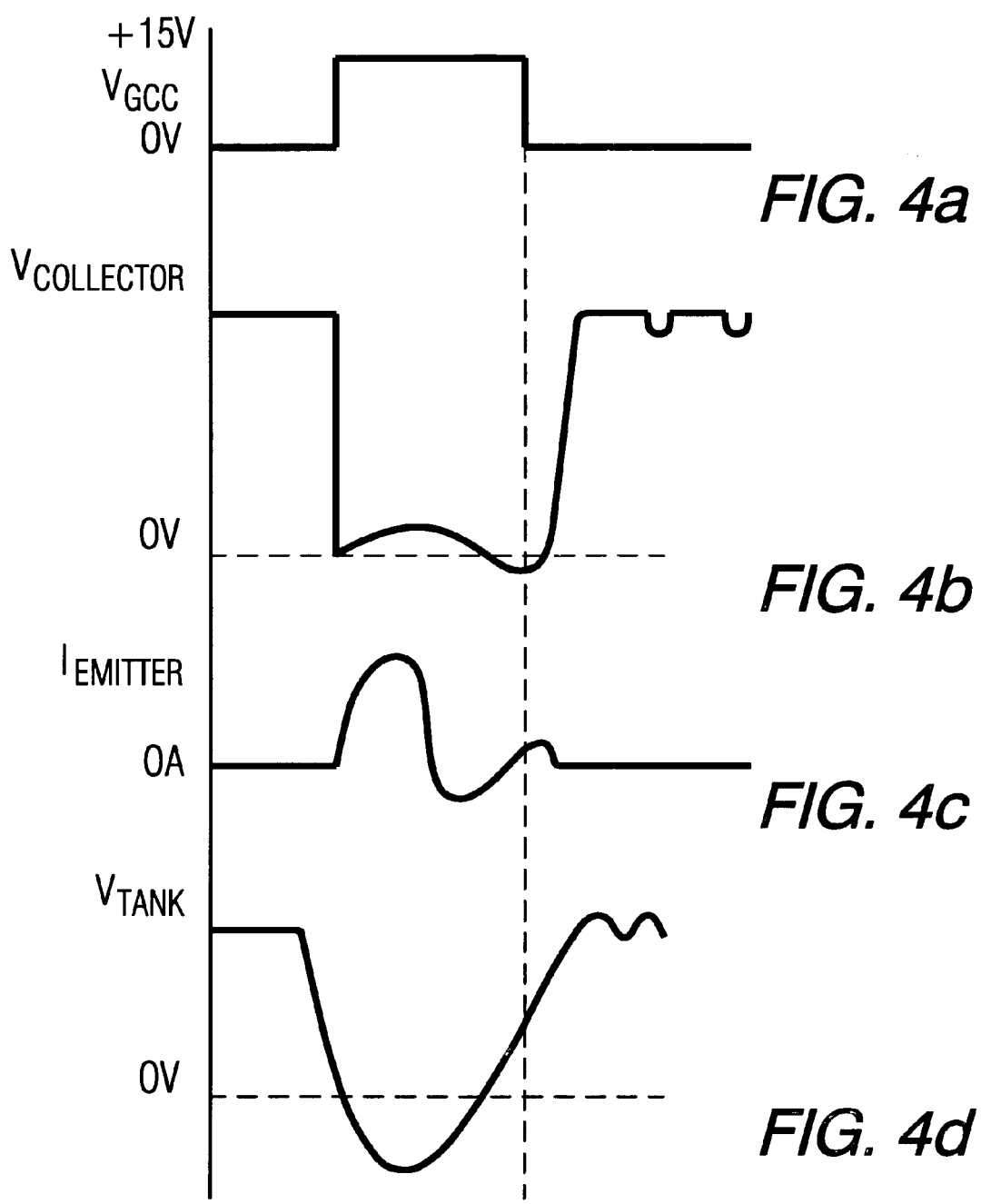

The operation of the circuit is best understood with reference to FIGS. 4a–4d. Consider the time just prior to $T_0$. At that time the IGBT is off and the capacitors 14, 31 are charged and no current is flowing through the inductor 32. At time $T_0$, the gate driver circuit 36 turns the IGBT 34 on and connects the collector to ground. At that time, the voltage on the collector falls to zero and the emitter current begins to rise in a sinusoidal manner. Likewise the voltage across the tank capacitor 31 begins to fall in a corresponding sinusoidal manner. Given the sizings of the tank capacitor 31 and tank inductor 32, the emitter current changes quicker than the tank voltage. With reference to FIG. 4b, note that the collector voltage will slightly rise and then fall below zero. This phenomenon is due to the presence of minority carriers in the collector. The inductor 32 limits the rise of the emitter current. Inductors 32, primary winding 33 and capacitor 31 set the frequency of the tank circuit 30. The tank capacitor 31 and the primary winding 33 store energy from inductor 32. As a result, the emitter current gradually decreases and, by design, reverses direction. The tank circuit 30 generates the quasi-sinusoidal waveforms for the collector voltage as shown in FIG. 4b and for the emitter current as shown in FIG. 4c. At a time $T_1$ after the collector voltage has gone below ground, the gate pulse terminates.

When the gate pulse is removed, there is a slight negative voltage on the collector due to the reversal in direction of the current flowing through the inductor 32 and the removal of minority carriers. Those minority carriers are quickly swept away by the inductor 32 which pulls the minority carriers out of the IGBT's collector and puts the minority carriers into the capacitor 31 that is across the primary winding 33 of transformer 35. Since the IGBT 34 is off, the energy stored in the capacitor 31 is transferred to inductor 33 in a resonant manner and from there into secondary coil 38 and load resistor 50.

It is important to note that the voltage $V_{TANK}$ of the tank circuit 30 (FIG. 4d) goes below ground. Also note that the gate pulse of the IGBT 34 does not terminate before the tank voltage goes negative. Thus, by delaying termination of the gate pulse on the IGBT until the emitter current has reversed direction, the inventive circuit pulls the minority carriers out of the collector. By reducing the number of minority carriers in the collector, the lifetime of the remaining minority carriers is likewise reduced. This cycle is repeated if the energy stored in the inductor 32 is dissipated. If the cycle is repeated too soon, the collector voltage will not go negative and the minority carriers will not be swept away from the collector.

The invention effectively changes the minority carrier modulation of the IGBT 34 and thus reduces switching losses. Those losses occur when there is a high voltage and high current in the collector when the IGBT is switched off. The collector current at turn-off is due to the presence of minority carriers in the collectors. The minority carriers in the collector will decay by recombination over time, if they are not swept out as described above. In effect, the IGBT at turn-off acts like a capacitor that is discharging. As a result, the more charge that is removed, the lower the losses. When a large number of minority carriers recombine at turn-off they generate heat. With the present invention, the minority carriers in the collector are removed by the tank circuit and the losses are reduced during turn-off.

Those skilled in the art understand that other embodiments of the circuit may be made without departing from the spirit and scope of the appended claims. For example, the circuit may be modified by omitting the transformer and using just a second inductor. It could also work with only one inductor if the tank capacitor is coupled to ground. Likewise, the relative locations of the IGBT and the tank circuit could be reversed so that the IGBT is coupled at its collector to the DC voltage source and the tank circuit and the transformer are coupled to the emitter. Such juxtapositions of circuit elements easily implemented by those skilled in the art.

What I claim is:

1. A converter for converting a first level of DC voltage and current to a second level of DC voltage and current with less ripple comprising:

a source of DC voltage;

an IGBT with a collector, gate and emitter;

a series connection of a capacitor and a first inductor coupled to the collector of the IGBT for imposing a sinusoidal form on the emitter current of the IGBT to reverse the direction of the flow of current in the IGBT; and an IGBT gate control circuit including means for turning off the gate after the emitter current reverses direction in order to remove minority carriers from the collector of the IGBT.

2. The converter of claim 1 wherein the series connection of the capacitor and the first inductor is coupled between the source of DC voltage and the collector of the IGBT.

3. The converter of claim 1 further comprising a second inductor coupled across the capacitor for receiving the minority carrier removed to the capacitor.

4. The converter of claim 1 further comprising a clamp circuit coupled to the collector of the IGBT and to the DC voltage source.

5. The converter of claim 1 further comprising a transformer having a primary coil coupled across the capacitor and a secondary coil coupled across a load, said primary coil for receiving the minority carriers swept into the capacitor when the IGBT turns off.

6. A method for converting a first level of DC voltage and current to a second level of DC voltage and current with less ripple comprising:

provide a source of DC voltage;

connecting a resonant tank circuit between the source of DC voltage and an IGBT; and turning on the gate of the IGBT and subsequently turning off the gate after emitter current reverses direction in order to remove minority carriers from the collector of the IGBT.

7. The method of claim 6 comprising the further step of connecting the swept minority carriers to a primary coil of a transformer for removing the minority carriers from the IGBT.

8. A converter for converting a first level of DC voltage and current to a second level of DC voltage and current with less ripple comprising:

a source of DC voltage;

an IGBT with a collector, gate and emitter;

a series connection of a capacitor and a first inductor coupled to the emitter of the IGBT for imposing a sinusoidal form on the emitter current of the IGBT to reverse the direction of flow of the current in the IGBT;

and, an IGBT gate control circuit including means for turning off the gate after the emitter current reverses direction in order to remove minority carriers from the collector of the IGBT.

9. A converter for converting a first level of DC voltage and current to a second level of DC voltage and current with less ripple comprising:

a source of DC voltage;

a resonant tank circuit coupled at one end to the source of DC voltage and at the other end to an IGBT, said tank circuit comprising a series connection of a tank inductor and a tank capacitor;

a clamp circuit couple to the collector of the IGBT and to the DC voltage source; and an IGBT with a collector, gate and emitter wherein the emitter is coupled to the resonant tank circuit for reversing current in the emitter;

an IGBT gate control circuit including means for turning off the gate after the emitter current reverses direction in order to remove minority carriers from the collector of the IGBT; and a transformer having a primary coil coupled across the tank capacitor and a secondary coil coupled across a load, said primary coil for receiving the minority carriers swept into the capacitor when the IGBT turns off.

* * * * *